July 12, 1927.  W. H. JOHNSON  1,635,550
FIGURE TOY
Filed Feb. 17, 1927
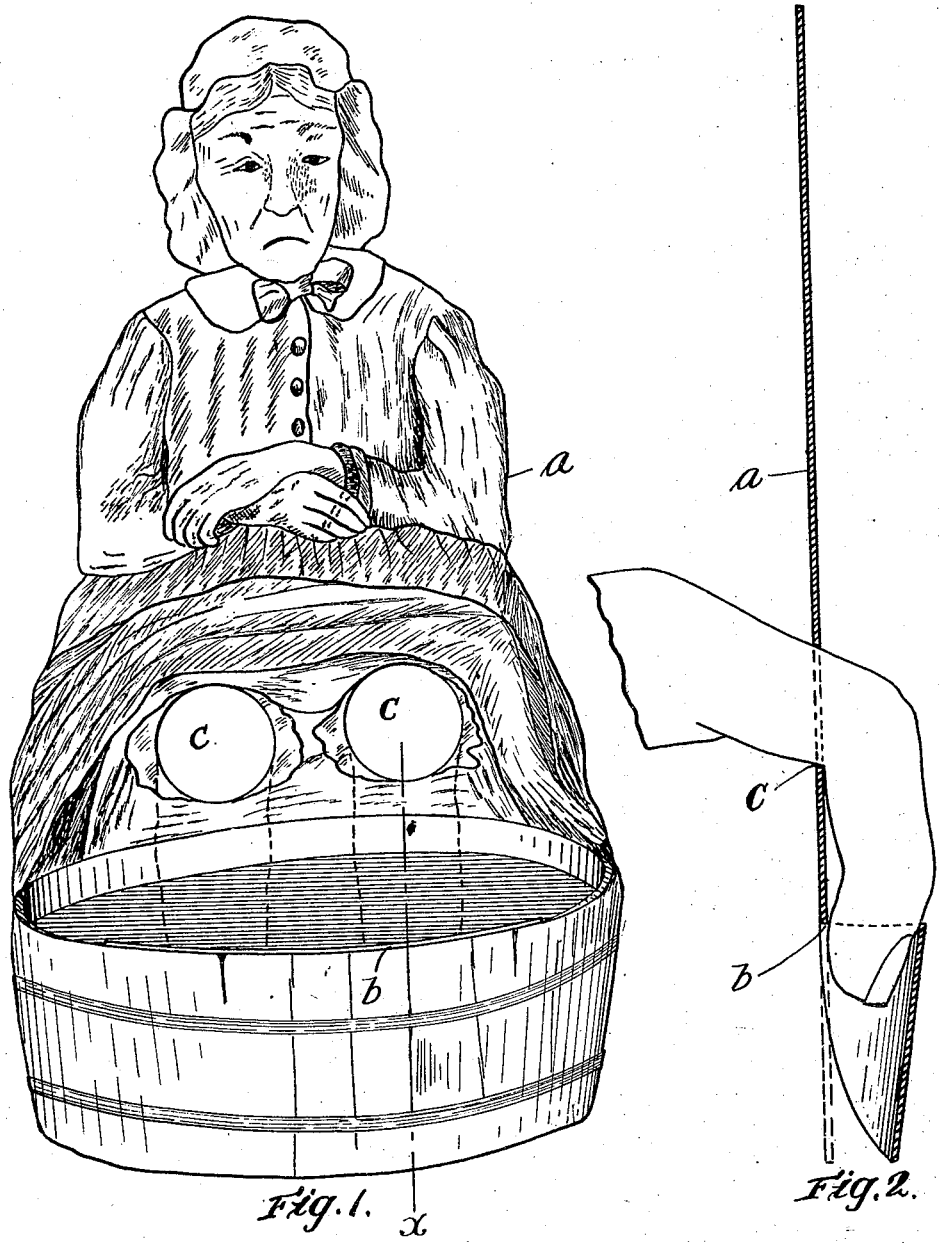

Patented July 12, 1927.

1,635,550

UNITED STATES PATENT OFFICE.

WILLIAM H. JOHNSON, OF HAVERHILL, MASSACHUSETTS.

FIGURE TOY.

Application filed February 17, 1927. Serial No. 168,958.

This invention relates to a form of display card for advertising, amusement and other purposes, and has for its object to provide a form of card so constructed that the fingers of the hand of a person holding it may be employed in connection therewith to represent the limbs of a figure shown on the card and give an illusion.

I accomplish this object by providing on the card an illustration of the figure of a person and of a receptacle in adjacent relation, and by providing thru the card one or more finger holes, in positions at which the limbs of the figure would appear, and a slit in the card adjacent said holes in a position corresponding to an opening in the receptacle, so that the fingers of the exhibitor may be passed thru the holes from the rear side of the card and inserted in the slit so as to conceal the tips thereof and represent them as inserted in the utensil.

For a more complete description of the invention, reference is made to the following, in connection with the accompanying drawing in which:

Fig. 1 is a view of the front side of a card embodying my invention, and

Fig. 2 is a sectional view thereof at approximately the line $x$ of Fig. 1.

As shown in the drawing a flexible card $a$, of ordinary paper stock, or other suitable material, is provided, on which the figure of a person is printed, or drawn, the card either a person is printed, or drawn, the card either being cut to the outline of the figure, or cut to provide a margin about the same, as preferred.

To secure, for example, the illusion of a person soaking the feet in a tub, or other receptacle, containing water, a form of wash tub is illustrated in perspective in front of the figure on the card, so that its entire rim is illustrated, a portion within the rim being shaded to indicate the surface of the water contained in the tub. The figure of the person is also shown in a position as seated behind the tub.

A slit $b$ is formed thru the card, at the line representing the front portion of the tub rim, and a pair of finger holes $c$ are formed thru the card, in a position approximating to the position in which the legs of the person represented would appear, if exposed, and at a distance above the slit to permit the fingers of the exhibitor to be passed thru the holes $c$ from the back side of the card and then bent down and inserted in the slit $b$, so that the tips thereof will be concealed behind the card. In this position the fingers will represent the bare legs of the figure, the joints thereof indicating the knees, as shown in the full lines of Fig. 2 and in dotted lines of Fig. 1. When inserting the fingers in the slit $b$, the portion of the card below the slit will be sprung forward from the flat position shown in dotted lines in Fig. 2, so that shown in full lines therein, the desired illusion being thus completed. In this position, the legs of the figure and the front of the tub will appear in a position in front of the other illustrations on the card, and, as the slit may extend for nearly the width of the receptacle illustrated, the fingers may be swung sidewise to increase the illusory effect. Other illusions, in which the fingers of the exhibitor represent the limbs of the figure illustrated, may be secured in a similar manner, as will be apparent.

I claim:

A figure toy comprising a card having the figure of a person and of an open receptacle represented thereon in adjacent relation, said card having finger holes therethru in the position in which the limbs of the figure represented would normally appear joined, and a slit adjacent thereto and in a position in which the said opening in the receptacle is represented, to permit the fingers of the exhibitor to be inserted thru the holes from the back of the card and passed thru the slit to conceal the tips thereof and represent the limbs of the figure as inserted in the receptacle.

In testimony whereof, I have signed my name to this specification.

WILLIAM H. JOHNSON.